United States Patent [19]

Van Leeuwen et al.

[11] Patent Number: 4,965,078

[45] Date of Patent: Oct. 23, 1990

[54] PREPARATION OF HARD CHEESE FROM CONCENTRATED MILK

[75] Inventors: Hendrikus J. Van Leeuwen, Emerald; Norman H. Freeman, Moorabbin; Brian J. Sutherland, Springvale South; Graeme W. Jameson, Kew, all of Australia

[73] Assignee: Commonwealth of Australia, Australia

[21] Appl. No.: 344,612

[22] Filed: Apr. 28, 1989

Related U.S. Application Data

[63] Continuation of Ser. No. 238,193, Aug. 30, 1988, abandoned, which is a continuation of Ser. No. 72,686, Jul. 13, 1987, abandoned, which is a continuation of Ser. No. 618,403, Jun. 1, 1984, abandoned.

[51] Int. Cl.$^5$ .................... A23C 19/024; A23C 19/04; A23C 19/05
[52] U.S. Cl. ........................................ 424/40; 424/36; 424/491
[58] Field of Search ...................... 426/34, 39, 40, 491

[56] References Cited

U.S. PATENT DOCUMENTS

| | | | |
|---|---|---|---|
| 3,899,596 | 8/1975 | Stenne | 426/40 |
| 3,988,481 | 10/1976 | Coulter et al. | 426/40 |
| 4,244,971 | 1/1981 | Wargel et al. | 426/40 X |
| 4,271,201 | 6/1981 | Stenne | 426/40 |
| 4,355,048 | 10/1982 | Schaap et al. | 426/40 |
| 4,401,679 | 8/1983 | Rubin et al. | 426/36 |

OTHER PUBLICATIONS

Kosikowski, F., Cheese and Fermented Milk Foods, Published by the Author, Ithaca, NY., 1966, pp. 65-78 & 194-211.
Ernstram et al., J. Da. Sci., vol. 63, 1980, pp. 228-234.
Green et al., Journal of Dairy Research, vol. 48, 1981, pp. 333-341.
Sutherland et al., The Australian Journal of Dairy Technology, Dec. 1981, pp. 136-143.

*Primary Examiner*—David M. Naff
*Attorney, Agent, or Firm*—Bacon & Thomas

[57] ABSTRACT

Cheese curd suitable for conversion into natural hard cheese is prepared by ultrafiltering and diafiltering milk or a milk product to produce a retentate, ripening the retentate by fermenting with a cheese starter culture, coagulating the retentate to produce a coagulum, cutting, cooking and agitating the cut coagulum to produce curd, and separating the curd from whey. The retentate has a concentration Factor of 2-8 and contains 1.0-6.2% w/w lactose. Ripening the retentate produces a pH drop of 0.05-1.5 units. Cutting the a coagulum is at a time between 120% and 220% of coagulation time and cooking is at a temperature of 30°-50° C. Combined cooking and agitating operations take 20-120 minutes. Coagulation may be continuous, and a minor portion of the retentate may be separated, fermented with a cheese starter culture and mixed with the remaining retentate to produce a ripened retentate having a pH of 0.05-1.0 units lower than before ripening.

20 Claims, No Drawings

PREPARATION OF HARD CHEESE FROM CONCENTRATED MILK

This application is a continuation of application Ser. No. 238,193, filed Aug. 30, 1988, now abandoned, which is a continuation of application Ser. No. 072,686, filed July 13, 1987, now abandoned, which is a continuation of application Ser. No. 618,403, filed June 1, 1984, now abandoned.

TECHNICAL FIELD

The present invention relates to the production of hard cheese and is particularly concerned with a process for the manufacture of cheese curd, which is suitable for conversion into natural hard cheese, from milk concentrated by ultrafiltration.

DEFINITIONS OF TERMS USED IN THIS SPECIFICATION

"Hard cheese" includes cheeses of the varieties specified as hard cheese in the International Dairy Federation Bulletin, Document 141, "IDF Catalogue of Cheeses" (1981); some of the more common hard cheese varieties being Cheddar, Colby, Cheshire, stirred curd, Parmesan, Pecorino and Romano.

"Milk" means the lacteal secretion obtained by the milking of one or more females of a mammalian species, such as cow, sheep, goat, water buffalo, or camel. Broadly speaking, such milk is comprised of casein (a phospho-protein) and soluble proteins, lactose, minerals, butterfat (milkfat), and water. The amount of these constituents in the milk may be adjusted by the addition of, or the removal of all or a portion of, any of these constituents. The term "milk" includes lacteal secretion whose composition has been adjusted.

Milk obtained by milking one or more cows is referred to as "cows milk". Cows milk whose composition has not been adjusted is referred to herein as "whole milk". It is comprised of casein, whey proteins, lactose, minerals, butterfat (milkfat), and water.

The composition of "cows milk" can be adjusted by the removal of a portion of or all of any of the constituents of whole milk, or by adding thereto additional amounts of such constituents. The term "skim milk" is applied to cows milk from which sufficient milkfat has been removed to reduce its milkfat content to less than 0.5 percent by weight. The term "lowfat milk" (or "part-skim milk") is applied to cows milk from which sufficient milkfat has been removed to reduce its milkfat content to the range from about 0.5 to about 2.0 percent by weight.

The additional constituents are generally added to cows milk in the form of cream, concentrated milk, dry whole milk, skim milk, or nonfat dry milk. "Cream" means the liquid, separated from cows milk, having a high butterfat content, generally from about 18 to 36 percent by weight. "Concentrated milk" is the liquid obtained by partial removal of water from whole milk. Generally, the milkfat (butterfat) content of concentrated milk is not less than 7.5 weight percent and the milk solids content is not less than 25.5 weight percent. "Dry whole milk" is whole milk having a reduced amount of water. It generally contains not more than five percent by weight of moisture on a milk solids not fat basis. "Nonfat dry milk" is the product obtained by the removal of water only from skim milk. Generally, its water content is not more than five weight percent and its milkfat content is not more than 1.5 weight percent. "Whole milk powder" is the dried product obtained by removal of water from whole milk. "Reconstituted milk" is a milk obtained by mixing whole milk powder or non fat dry milk with water. "Recombined milk" is a milk prepared by blending non fat dry milk, water and a suitable source of milk fat such as cream, butter or anhydrous milk fat.

Thus, the term "milk" includes, among others, whole milk, low fat milk (part-skim milk), skim milk, reconstituted milk, recombined milk, and whole milk whose composition has been adjusted.

The term "whey proteins" means milk proteins that generally do not precipitate in conventional cheese making processes. The primary whey proteins are lactalbumins and lactoglobulins. Other whey proteins that are present in significantly smaller concentrations include euglobulin, pseudoglobulin, and immunoglobulins.

BACKGROUND ART

The manufacture of cheese from milk concentrated by ultrafiltration (UF) is a radical innovation in cheesemaking which has been introduced to increase the yield of cheese. The increase in yield, which may exceed 20%, is due to incorporation into the cheese of soluble proteins, principally $\alpha$-lactalbumin and $\beta$-lactoglobulin. In conventional cheesemaking, these proteins are almost totally lost in the whey. Cheesemaking by UF offers other advantages, including reduced rennet consumption, a more uniform product, a less-polluting effluent, more efficient fat utilization, more uniform cheese weights, and the possibility of continuous cheese manufacture. In addition, the principal effluent (permeate) is particularly well suited to further processing, e.g. lactose crystallization or hydrolysis. The principle of manufacturing cheese from milk concentrated by UF (called retentate) in order to obtain increased cheese yield, is well known (Maubois et al, Aust. Pat. No. 477,339 (1978); Maubois et al, *Le Lait*, 51, 495, 1971) and is now used commercially in the manufacture of some varieties of soft (i.e. high moisture) cheese.

Ultrafiltration is a pressure-driven membrane separation process, utilizing pressures of 0.1–1.0 MPa and membranes with pore sizes of 5–35 nm. Macromolecules (e.g. proteins) and fat globules are retained on the feed side of the membrane, in the retentate, while the solvent (water) and small solute molecules (lactose, inorganic ions etc.) pass through the membrane and constitute the permeate. The principles of UF, the equipment available, and its application in dairy processing have recently been reviewed (Glover et al. (1978) *J.Dairy Res.*, 45, 291). UF is now a commercially accepted technique for dairy processing. In most of the installed equipment, milk can be concentrated about 5-fold, but in new equipment now becoming available the attainable concentration factor may reach 9:1.

The well known process by which soft cheeses are manufactured from milk UF retentate was pioneered and patented by French workers (Maubois et al. op.cit). It is based on the concentration of whole or skim milk by UF, with the addition of high-fat cream in the latter case, to yield a product ("pre-cheese") containing about 60% moisture and having a gross composition similar to that of the desired cheese. Coagulation and fermentation of the pre-cheese affords the finished cheese directly, with little or no whey drainage or loss of whey proteins. The rennet requirement is reduced by approximately 80%. Camembert made by this process was initially claimed to be indistinguishable from the conventionally made cheese but more recently it has been reported to have flavour and textural defects.

The experimental manufacture of certain semi-hard cheeses from milk concentrated by UF has been reported. The varieties include Mozzarella, Gouda, blue-vein cheese, St. Paulin, Herve, and Havarti. In all cases, the desired moisture content was achieved by whey drainage. The volume of whey from the St. Paulin was exceptionally small, as this cheese was made from milk ultrafiltered to 45-46% solids by using new mineral membranes. These membranes are not in general use.

The manufacture of hard cheese from retentate presents difficulties much greater than those encountered in the manufacture of soft and semi-hard cheeses. The difficulties derive from the requirements of (i) removing more water from the retentate (typically 60% moisture in 5:1 retentate) in hard cheese manufacture than in soft cheese manufacture in order to achieve the desired composition, while (ii) retaining the sensory attributes of the cheese variety and (iii) simultaneously achieving a sufficient yield increase to justify introducing the UF-based process.

DISCLOSURE OF THE INVENTION

It is therefore an object of the present invention to provide a process which overcomes these difficulties.

According to the present invention there is provided a process for the manufacture of cheese curd suitable for converting into a hard cheese comprising the sequential steps of:

(i) concentrating a milk or milk product by ultrafiltration to produce a retentate having a Concentration Factor in the range of 2-8 and simultaneously, or subsequently, reducing the lactose in the retentate to a level of 1.0% to 6.2% w/w by diafiltration;

(ii) ripening the retentate with at least one suitable cheese starter culture for a time sufficient to produce a drop in pH in the retentate in the range of 0.05 to 1.0 pH units;

(iii) coagulating the ripened retentate with calf rennet or other suitable milk coagulating agent;

(iv) cutting the coagulum at a time between 120% and 220% of the rennet coagulation time, said cutting being performed in such a manner that no adverse disruption of the internal structure of the coagulum occurs;

(v) cooking the coagulum to a temperature in the range of 30°-50° C., holding the cooked coagulum at the final cooking temperature until a curd of composition suitable for converting into a hard cheese is produced, said operations of cooking and holding being performed immediately after cutting while agitating the coagulum under conditions that do not cause adverse physical damage to the coagulum but are sufficient to prevent fusion and to promote syneresis, the total duration of said operations lying in the range 20-120 minutes; and (vi) separating the curd from whey expelled during syneresis in step (v).

The term "milk or milk product" used in the foregoing statement of invention, is intended to mean any milk which has, if necessary, been appropriately standardized, that is, adjusted in composition by addition or removal of skim milk or cream to ensure that the finished cheese will comply with legal standards for fat content, and which has been optionally acidified and/or heat treated.

The step of ultrafiltration may be performed in any suitable UF plant but preferably in a plant specifically designed to minimise shear damage and to have a low residence time (e.g. less than 20 minutes). The process may be performed at milk temperatures in the range 5° C. to 60° C. and final concentrations may be in the range CF=2 to CF=8. The range from about CF=4 to about CF=6 is preferred as it can be readily and economically achieved with commercial equipment which is widely available.

$$\left( CF = \text{Concentration Factor} = \frac{\text{Milk weight}}{\text{Retentate weight}} \right)$$

Diafiltration may be performed as a separate process step or concurrently with ultrafiltration to reduce the concentration of lactose in the aqueous phase of the retentate. The lactose content of the retentate is in the range 1.0% to 6.2% (w/w). The preferred lactose content depends on the CF, the buffer capacity of the retentate and on the desired pH in the final cheese.

In some embodiments of the process it may be preferred to ultrafilter skim milk, low fat milk, or reconstituted or recombined milk. Butterfat in a suitable form, eg. cream, anhydrous milk fat or butter, is added to this retentate at a suitable time after UF but before coagulation and in sufficient quantity to ensure that the finished cheese will comply with the legal requirements for composition. In this embodiment, the lactose content of the retentate may need to be suitably adjusted to allow for any lactose added with the butterfat source.

In some embodiments of the process it may be preferred to raise the solids content of the ultrafiltered/diafiltered retentate by evaporation of water before proceeding with the remainder of the process operations. Such a step has the effect of reducing the volume of whey drainage during the agitation and cooking phases and thus increasing the retention of soluble components normally lost in the whey. The retentate may be concentrated up to 4 times by use of any suitable evaporation means; the preferred technique being vacuum evaporation in a continuous swept-surface or scraped-surface vacuum evaporator.

Heat treatment may be performed following diafiltration in any suitable apparatus, at a temperature of up to about 90° C. for a period of up to about 40 minutes or equivalent in terms of bacterial destruction.

Ripening is a very important step of the process. It may be carried out in one of two ways: either (a) by fermenting the whole of the retentate: One or more cultures of lactic acid bacteria is added to the retentate at a temperature in the range 20°-45° C. and held for sufficient time to produce a drop in pH in the range 0.05 to 1.0 pH units from the initial pH value of the retentate (which would normally be about 6.7 but which may be lower if the milk was acidified before, during or after ultrafiltration in order to reduce the mineral content and/or the buffer capacity of the retentate); or (b) by fermenting a minor portion of the retentate and mixing this with the major portion: 1 to 20% of the bulk retentate is heat treated at a temperature of up to about 90° C. for up to about 40 min or equivalent in terms of bacterial destruction and inoculated at 20° C.-45° C. with one or more suitable cultures of lactic acid bacteria.

The inoculated retentate is held to allow a pH drop due to fermentation of 0.2 to 2.0 pH units from the initial pH value of the retentate (which would normally be about 6.7 but which may be lower if the milk was acidified before, during or after ultrafiltration in order to reduce the mineral content and/or the buffer capacity of the retentate). This fermented portion of the retentate may then be thoroughly mixed with the remaining bulk of the retentate or it may be held until required at a temperature sufficiently low to prevent excessive further pH drop or loss in activity.

In the case where the temperature following any heat treatment or the ripening differs from the preferred coagulation temperature, which may be in the range of 20°–40° C., the temperature may be adjusted appropriately.

Allowable additives such as calcium chloride, phosphoric acid, lipases, esterases, proteases, peptidases and food colouring may be added to the milk or retentate at any stage prior to coagulation.

The step of coagulation is effected by the action of "rennet", i.e. a suitable milk coagulating enzyme or mixture of enzymes of animal and/or microbial origin or other suitable milk coagulating agent. Rennet is added in sufficient quantity to induce coagulation in 5 to 30 minutes. To facilitate dispersion the rennet may be diluted in pure water. Following rennet addition the retentate is agitated thoroughly and allowed to undergo quiescent coagulation.

Coagulation may be performed in a batch or continuous process or a combination of both. In the batch process, mixing of retentate and diluted rennet may be performed in any suitable vessel equipped for high intensity agitation. Coagulation may be performed in any suitable retaining vessel. This vessel should be designed to facilitate discharge of the coagulum prior to the next process operation.

In the continuous process, ripened retentate and diluted rennet are metered into a low-volume vigorously agitated mixer using high precision metering pumps. The mixer may take the form of a small continuously agitated vessel, either open or closed, with discharge to the coagulation device by overflow of a weir in the case of the open vessel or by pipe under pressure in the case of the closed vessel. Alternatively, the mixer may be of a static in-line type in which mixing is promoted by sequential division of the flowing fluid into separate streams, e.g., Kenics mixer. Renneted retentate is then fed into a continuous coagulation device consisting of either:

(a) a tube device, disposed at a suitable angle and having any suitable cross-section and having non-porous walls of stainless steel, silanized glass or plastic, either with or without a friction modifying coating, and provided with means for temperature regulation, (b) a device in which coagulation of rennetted retentate takes place in moving containers. When coagulation is complete the coagulum is transferred without disruption to a cutting apparatus. A suitable device is described in Australian patent application No. PF9729 entitled "Coagulum Transfer Apparatus", (c) any suitable commercially available coagulator, e.g., ALPMA coagulator.

The duration of the time between rennet addition and cutting of the coagulum in step (iv) of the process is critical in its effect on the final curd composition, cheese yield and cheese quality.

For hard cheese, the cutting time must be between 120% to 220% of the time from rennet addition to the appearance of the first visible signs of coagulation (called Rennet Coagulation Time-RCT). For example, in the manufacture of Cheddar cheese, for retentate with CF=5 at pH 6.6 rennetted at 30° C. with 0.5% of a 1:5 dilution of standard strength calf rennet in water, RCT is typically 9 minutes. For Cheddar cheesemaking this coagulum may then be cut at times in the range 10.8 to 19.8 minutes after rennetting, although the optimum time range is 14 to 16 minutes.

In contrast to the above relationship between RCT and cutting time, the cutting time in manufacture of hard cheese from milk of normal concentration is never less than 220% of the RCT and is usually in the range 250% to 350% of the RCT.

In the present process, cutting the coagulum at times less than 120% of the RCT will cause severe disruption of the coagulum and result in excessive loss of fat and fines during later operations. Cutting coagulated retentate at times greater than 220% of the RCT leads to production of cheese having excessive moisture content and a likelihood of developing over-acid flavours during maturation.

The coagulated retentate may be cut into particles of any suitable shape and size. It is preferred that the particles by generally cubic in shape with a length of side in the range from about 5 mm to about 15 mm. Moderate departures from a cubic shape (e.g. parallelepiped) are permissible provided that losses of curd fines and fat in the whey are not unduly elevated. Excessive departures from a cubic shape result in particles with corners which are unduly susceptible to breakage, with consequent formation of fine particles and leakage of fat.

Coagulated retentate, at the optimum time for cutting and commencement of agitation, possesses some special characteristics which distinguish it from curd formed during conventional hard cheese manufacture from milk of normal concentration. The properties of principal concern are:

(i) Firmness—because of its high protein content coagulated retentate is very much firmer than normal milk coagulum.

(ii) Susceptibility to damage—the internal structure of the coagulated retentate is weak. The weakness is such that even modest accelerations and shear forces, such as those applied during cutting and agitation of the coagulum in conventional cheesemaking practice, if applied to the bulk or subdivided coagulum at this stage, will cause disruption of the internal structure and loss of integrity of the developing protein network. The consequences of such disruption may appear later in the process as excessive loss of fat and fines during the syneresis stage and defective body and texture in the finished cheese.

(iii) Re-fusion of cut coagulum—freshly cut surfaces of coagulated retentate tend to fuse rapidly, producing large aggregates. Such aggregation inhibits syneresis during agitation and cooking and results in cheese with excessive moisture content.

(iv) Rate and volume whey release—compared with the high rate of release of whey which occurs immediately following the cutting of the coagulum during the manufacture of hard cheese from milk of normal concentration, the rate of release of whey from the cut particles of coagulated retentate in the present process is very slow. Thus, the cushioning effect of whey between curd particles is largely absent during the early stages of whey release. The total volume of whey released from coagulated retentates is also very much less than that released from normal milk coagulum, e.g., for retentate with CF=5 the total volume of whey released during production of curd for hard cheese is approximately 10% of that released from a normal milk coagulum.

Because of the combined effects of the special characteristics of coagulated retentate (see (i)–(iv) above), it must be cut and agitated in such a manner that no adverse disruption of the internal structure of the coagulum occurs or the resultant cheese curd will be obtained in low yield with abnormal composition and defectiveness in body, texture and flavour. For example, cutting the coagulum too early will cause extensive shattering of the coagulum, generating quantities of fine particles and occasioning losses of fat into the whey. Cheese yield is therefore reduced, and the resulting cheese is likely to have a fat content that is too low, and to be excessively firm and short in body and crumbly or mealy in texture. As previously indicated, similar effects may arise from application of excessive mechanical force to the coagulum or coagulum particles. Examples of excessive mechanical force include (i) dropping coagulum particles from heights of 3 metres or more on to bare metal surfaces, and (ii) pushing the coagulum prior to cutting along a tube and around a sharp 90 degree bend.

In practice when using the present process, the coagulum is discharged from the coagulation vessel or tube and is transported without delay and with adequate support to maintain shape through sets of cutting wires or blades in such a manner as to subdivide the coagulum into particles of the desired shape and size without causing any significant disruption of the internal structure of the coagulum.

Agitation commences immediately after cutting the coagulum. Any substantial delay in commencement of agitation will result in fusion into aggregates (see note (iii) above). Also because of the constraints imposed by the characteristics (ii) and (iv) (above), the agitation must be very gentle, especially during the first 10 minutes, after which time the intensity of agitation may be increased. Agitation is typically performed in a horizontal or inclined cylinder, fitted internally with lifting vanes, and rotated at controlled speed around its axis. The vanes are positioned so that as the curd particles are gently lifted and dropped the forces generated are insufficient to cause any physical damage but are sufficient to prevent fusion and to promote syneresis. The rotation speed of the cylinder is such as to optimally prevent curd fusion and promote syneresis. The lifting action should be so gentle that the motion imparted to the curd particles approaches a continuous rolling or tumbling action. Excessively vigorous agitation will cause increased losses of fat and/or curd fines.

The step of cooking is the process of steadily, or stepwise, raising the temperature of the cut coagulum from the coagulation temperature (20°–40° C.) to the maximum cooking temperature (30°–50° C.) whilst the curd is continuously agitated. This process is commenced within 10 minutes of cutting and is completed in between 20 to 60 minutes. The total residence time in the agitation/cooking device is in the range 20 to 120 minutes. For curd made from retentate with CF=5, the total residence time in the agitation/cooking device can be from 30 to 90 minutes, and the optimum time is about 60 minutes. When ultrafiltration processing time (preferably less than 20 min) and time for mixing previously ripened retentate and rennet with the retentate are taken together with the optimum cutting time of 14–16 minutes for CF=5 retentate and the optimum agitation/cooking time, the overall process duration for production of curd suitable for conversion to Cheddar-type cheese is found to be approximately 100 minutes. The conventional process for manufacturing this type of curd takes approximately 200 minutes. A saving in process time of approximately 100 minutes is thus obtained when using CF=5. The magnitude of the saving in process time and the cheese yield increase obtained by using the process both vary according to the CF used. Reducing the CF generally reduces the yield and increases the optimum process time as the nature of the process approaches conventional cheesemaking more closely.

During the period from cutting to the end of agitation, certain changes occur in the curd. Lactose and other sugars are metabolized by the starter organisms, the principal product being lactic acid. Thus, the pH of the curd drops and certain minerals in the curd are solubilized. Whey drains from the curd, carrying with it any water-soluble components sufficiently small in size to diffuse through the protein network of the curd, e.g., lactose, soluble minerals. In the present process this whey may be continuously drained from the curd via drainage ports provided in the wall of the agitation/cooking device, or it may be retained with the curd until the point of discharge.

When the curd is in the desired condition for the commencement of the next phase of the cheesemaking process, e.g. Cheddaring, it is discharged from the agitation/cooking device and separated from the whey by any conventional means. Subsequent handling of the curd may be performed using any of the established methods for post-vat operations in conventional cheesemaking processes. The composition and condition of the curd after discharge from the agitation/cooking device should be similar to the composition and condition of curd produced conventionally in the corresponding hard cheese manufacturing process at the point of discharge from the vat, and the process parameters are to be adjusted within the specified ranges to ensure that this is the case. The composition and condition of the curd from the UF-based process at this point must be such that good quality cheese of the desired variety is obtained in elevated yield (relative to conventional manufacture) by conventional finishing operations. In this context "finishing operations" should be understood to include the conventional post-vat cheese manufacturing operations (manual or mechanised, discontinuous or continuous) appropriate to manufacture of the desired variety of hard cheese.

Preferred embodiments of the invention will now be given in the following examples.

EXAMPLE 1

Cheddar Cheese from Milk Concentrate (illustrating the preferred method for Cheddar cheese manufacture)

210 Kg of whole milk was standardized by the addition of cream to yield a casein/fat ratio of 0.73 (see Table 1). The milk was then pasteurized by a heat treatment of 72° C. for 15 seconds, followed by cooling to 50° C. The pasteurized milk was subjected to membrane ultrafiltration in a spiral-wound Abcor stages-in-series UF plant fitted with 8 modules of 4m² filtration area, 4 stages, membrane type HFK-130. Ultrafiltration was carried out at 50° C. and the mean residence time was 18 min. Diafiltration was carried out concurrently with UF by addition of water in an amount equal to 4% of the milk volume (2% of milk volume injected into each of stages 3 and 4). The retentate was cooled to 31° C. and was approximately 20% of the weight of the original milk (Concentration Factor CF=4.6; see Table 1).

45.5 Kg of retentate was weighed into a mixing vessel. 4.5 Kg of the retentate (i.e. 10%) was inoculated with 4.5 g of a frozen starter concentrate consisting of 3 strains of *Streptococcus cremoris* (Direct Set cheese culture supplied by Mauri Bros. Laboratories, Sydney, Australia). Fermentation proceeded at 25° C. to a pH of 5.6. This fermented portion was mixed with the remaining retentate to give a ripened retentate of pH 6.4.

The ripened retentate was rennetted with 0.5% of a freshly prepared 1:5 dilution of calf rennet (clotting strength about 1:8500, supplied by Ch. Hansen's Lab., Copenhagen, Denmark) in water, mixed and apportioned into 7 rectangular stainless steel troughs (115 mm width, 760 mm length, 150 mm height) maintained at 31° C. After 16 min the coagulum was discharged from the troughs by inversion. The slabs of coagulated retentate were cut into 10 mm cubes with the aid of a special cutting device consisting of a 190 mm cubic stainless steel box with 2 adjacent open faces. One of these was strung with monafilament nylon at 10 mm centres parallel to the other open face. The coagulum was pushed through this face, slicing it, and then pushed by means of a hydraulically operated plunger through the other open face which was strung with crossed monafilament nylon, also at 10 mm spacing. The cubed coagulum was discharged into a stainless steel cylinder (760 mm diameter, 660 mm length) fitted with 4 vanes (215 mm wide, running full length of drum) equally spaced around the drum circumference, and each inclined at 15° to the radius passing through the vane fastening point. The drum was preheated to 31° C. and rotated at 3 rpm. Cooking of the curd particles commenced immediately by heat applied to the outside of the cylinder such that the rate of increase of curd temperature was approximately linear. After 60 min in the cylinder the curd temperature was 38° C.

The cooked curd was then discharged from the cylinder into a Cheddaring vat and the whey was drained off. The curd was piled and Cheddared manually at 37° C. for 1 hr 35 min after which time the pH of the curd was 5.60.

The Cheddared curd (pH 5.60) was milled, salted (at a rate of 2.7%), hooped and pressed overnight by conventional methods.

The cheese was weighed, sampled for analysis (see Table 1), packed in impermeable film under vacuum and stored at 8° C. for 12 months. Cheeses were organoleptically assessed at 3 weeks, 6 weeks, 3 months, 6 months and 12 months.

The body, texture, flavour and general acceptability of the cheese was compared with cheese which was manufactured by conventional methods from milk from the same batch. The cheeses were found to be of equal quality and were highly acceptable. The yield of the cheese from the UF-based process was 9.4% higher than for the equivalent conventionally made cheese based on recovery of milk solids in the cheeses (ie. correcting for differences in salt and solids contents of the cheeses).

TABLE 1

| Conventional Process | UF Based Process |
|---|---|
| Standardized Milk 210 Kg | Standardized Milk 210 Kg |
| 2.71% casein, 3.70 fat<br>pasteurization<br>starter addition<br>rennet addition | 2.71% casein, 3.70 fat<br>pasteurization<br>ultrafiltration/<br>diafiltration |
| Coagulated Milk | Retentate |
| cutting<br>agitation<br>cooking | 38.0% total solids,<br>pH 6.7<br>ripening to pH 6.40<br>rennet addition |
| Drained Curd | Coagulated Retentate |
| Cheddaring<br>milling<br>salting<br>hooping<br>pressing | cutting<br>agitation<br>cooking |
| 22.05 Kg Cheese | Drained Curd |
| 37.9% moisture, 49.9% FDM,<br>pH 5.23 (ex-press),<br>1.37% salt | pH 6.13<br>Cheddaring<br>milling<br>salting<br>hooping<br>pressing |
| | 23.99 Kg Cheese<br>37.6% moisture,<br>49.9% FDM, pH 5.50<br>(ex-press), 1.56% salt<br>Yield increase 9.4% |

(FDM = fat content in dry matter)

EXAMPLE 2

Cheddar cheese (illustrating variations in the UF Concentration Factor and in ripening, coagulation and cooking parameters)

400 Kg of whole milk was standardized, pasteurized and ultrafiltered essentially as in Example 1 except that the ultrafiltration Concentration Factor was 5.0 (see Table 2).

A 5% portion of the retentate (4.0 kg) was inoculated at 25° C. with 60 g of the frozen starter concentrate used in Example 1, and fermentation allowed to proceed at 25° C. to a pH of 5.4. The fermented retentate was mixed with the remaining retentate (cooled to 31° C.) to give ripened retentate of pH 6.55.

Rennetting and coagulation were carried out as in Example 1, except that coagulation was allowed to proceed for only 15 minutes. Subsequent cutting and cooking of the coagulum also proceeded as in Example 1 except that heating from 31° C. to 38° C. took place over 50 minutes, followed by maintenance of the temperature at 38° C. for another 10 minutes of agitation.

Whey was drained off and Cheddaring carried out as in the preceding Example. The duration of Cheddaring was 1 hr 40 min, after which time the pH of the curd was 5.70.

Subsequent cheesemaking operations and evaluation of the product were exactly as for Example 1. The yield of cheese from the UF-based process was 8.2% higher than that from the equivalent conventional process, based on recovery of milk solids. Cheese quality was satisfactory.

TABLE 2

| Conventional Process | UF Based Process |
|---|---|
| Standardized Milk 400 Kg | Standardized Milk 400 Kg |
| 2.57% casein, 3.80% fat<br>pasteurization<br>starter addition<br>rennent addition<br>↓ | 2.57% casein, 3.80% fat<br>pasteurization<br>ultrafiltration/<br>diafiltration<br>↓ |
| Coagulated Milk | Retentate 80 Kg |
| cutting<br>agitation<br>cooking<br>↓ | 39.5% total solids,<br>18% fat, lactose 3.7%,<br>pH 6.7<br>ripening to pH 6.55<br>rennet addition<br>↓ |
| Drained Curd | Coagulated Retentate |
| 49.5% total solids<br>Cheddaring<br>milling<br>salting<br>hooping<br>pressing<br>↓ | cutting<br>agitation<br>cooking<br>↓ |
| 37.7 Kg Cheese | Drained Curd |
| 36.40% moisture<br>53.4% FDM, pH 5.35,<br>1.48% salt | 49.8% total solids<br>Cheddaring<br>milling<br>salting<br>hooping<br>pressing<br>↓ |
| | 41.4 Kg Cheese<br>36.95% moisture<br>51.5% FDM, pH 5.45,<br>1.8% salt<br>Yield increase 8.2% |

EXAMPLE 3

Cheddar cheese (illustrating lower UF Concentration Factor and alternative method of ripening the retentate)

207 Kg of whole milk was standardized, pasteurized and ultrafiltered essentially as in Example 1, except that in ultrafiltration the Concentration Factor was reduced to 4.39 (see Table 3).

The retentate (47 kg) was cooled to 31° C. and inoculated with 61 g of the frozen starter concentrate used in Example 1. Fermentation of the entire bulk of retentate proceeded at 31° C. until the pH was 6.21.

The ripened retentate was coagulated with rennet, and the coagulum cut, agitated and cooked exactly as in Example 1. After whey drainage and Cheddaring the curd pH was 5.37. The subsequent cheesemaking operations were as in Example 1. The resulting cheese was of the composition shown in Table 3, was of acceptable quality, and was obtained in 7.3% greater yield than an equivalent conventionally-made control cheese, based on recovery of milk solids in cheese.

TABLE 3

| Conventional Process | UF Based Process |
|---|---|
| Standardized Milk 207 Kg | Standardized Milk 207 Kg |
| 2.66% casein, 3.73% fat<br>↓ | 2.66% caseing, 3.73% fat<br>↓ |
| | Retentate 47 Kg |
| | 35.49% total solids,<br>3.08% lactose,<br>pH 6.7<br>↓ |
| Cheese 20.66 Kg<br>34.2% moisture, 49.4% FDM,<br>pH 5.23, 1.93% salt | Cheese 23.22 Kg<br>37.5% moisture,<br>49.6% FDM, pH 5.30,<br>1.53% salt<br>Yield increase 7.3% |

EXAMPLE 4

Short Method Cheddar (illustrating application of the UF-based process in the Short Method of Cheddar Manufacture, based on method described by L. A. Hammond, Proc. 1st Biennial Marschall Int. Cheese Conf., Madison, Wis., USA, p.495 (1979))

273 Kg of whole milk was standardized, pasteurized and ultrafiltered essentially as in Example 1, with CF=4.62. The retentate was cooled to 31° C. and two separate portions inoculated with frozen starter concentrates supplied by Mauri Laboratories, Sydney, Australia, as follows:

(a) 6 kg of retentate inoculated with 90 g of a 3 strain mixture of Streptococcus cremoris and fermented for 2 hours at 31° C. to pH 5.4.

(b) 3 kg of retentate inoculated with 50 g of Streptococcus thermophilus TS2 frozen concentrate and fermented for 2 hours at 40° C. to pH 5.6.

Both portions of fermented retentate were mixed with the remaining unfermented retentate to yield ripened retentate which was coagulated with rennet as previously. The coagulum was cut, agitated and cooked as in Example 1, except that the final cooking temperature was 42° C. after heating for 1 hour. Following whey drainage, Cheddaring was carried out for 45 minutes only, to a curd pH of 5.65. Subsequent cheesemaking operations were as in Example 1. The resulting cheese was acceptable as Cheddar cheese and was obtained in 8.5% greater yield than the conventionally-made control, based on milk solids recovery in cheese.

TABLE 4

| Conventional Process | UF Based Process |
|---|---|
| Standardized Milk 273 Kg | Standardized Milk 273 Kg |

TABLE 4-continued

| Conventional Process | UF Based Process |
|---|---|
| 2.71% casein, 3.70% fat<br>Conventional<br>"Short Method"<br>Cheddar manufacture<br>↓ | 2.71% casein, 3.70% fat<br>↓<br>Retentate 59.1 Kg<br>↓ |
| Cheese 28.63 Kg<br>37.9% moisture, 49.9% FDM,<br>pH 5.23, 1.37% salt | Cheese 30.91 Kg<br>37.4% moisture,<br>48.7% FDM, pH 5.42,<br>1.55% salt<br>Yield increase 8.5% |

EXAMPLE 5

Colby cheese (illustrating application of UF-based method to manufacture of Colby cheese)

325 Kg of whole milk was standarized, pasteurized and ultrafiltered essentially as in Example 1, with CF=5.04. The retentate (64.5 kg) was cooled to 31° C. and inoculated with 130 g of the frozen starter concentrate used in Example 1. Fermentation of the entire bulk of retentate proceeded for 1.75 hr at 31° C., after which the retentate pH was 6.35.

Rennetting, cutting of the coagulum, agitation and heating were carried out as in Example 1. The final cooking temperature was 37.5° C.

The cooked curd was discharged into a vat, the whey drained off, and the curd dry-stirred 5 times over a period of 35 minutes, during which the curd temperature dropped to 31° C. and the pH to 5.60. The curd was then dry-salted at a rate of 2.3%, and then hooped and pressed overnight as in Example 1. After maturation the resulting cheese was found to be of acceptable quality and similar to a control Colby cheese made conventionally at the same time. The yield increase obtained by use of the process based on ultrafiltration was 4.8%, based on milk solids recovery in cheese.

TABLE 5

| Conventional Process | UF Based Process |
|---|---|
| Standardized Milk 325 Kg | Standardized Milk 325 Kg |
| 2.58% casein, 3.77% fat<br>Conventional<br>Colby cheese<br>manufacture<br>↓ | 2.58% casein, 3.77% fat<br>↓<br>Retentate 64.5 Kg<br>↓ |
| Colby Cheese 36.37 Kg<br>40.6% moisture, 52.6% FDM,<br>pH 5.17, 2.06% salt | Colby Cheese 35.65 Kg<br>37.4% moisture,<br>52.7% FDM, pH 5.15,<br>1.27% salt<br>Yield increase 4.8%<br>(based on milk solids) |

EXAMPLE 6

Parmesan cheese (illustrating use of the UF-based process in the manfuacture of Parmesan cheese)

331 Kg of whole milk was standarized to a casein/fat ratio of 1.22, and then pasteurized and ultrafiltered essentially as in Example 1 except that the total diafiltration rate was 3.6% (water addition rate relative to milk intake rate), and the CF was 5.0.

The retentate, cooled to 31° C., was inoculated with 40 g of the frozen starter concentrate used in Example 1, together with 50 g of *Streptococcus thermophilus* TS2 frozen starter concentrate and 40 g of *Lactobacillus bulgaricus* LB1 frozen starter concentrate, all obtained from Mauri Laboratories, Sydney. Fermentation proceeded from 2 hours at 31° C., when a pH of 6.4 was reached. Lipase (1.6 g, Type VII from Sigma Chemical Co., St. Louis, Mo., USA) was added, and the retentate coagulated with calf rennet as in Example 1. After setting for 16 minutes the coagulum was cut using the same procedure as in Example 1 but into smaller particles—the cubes of coagulum obtained had 5 mm sides.

The equipment and general procedures used for agitation and cooking also resembled those of Example 1, but the duration of the cooking operation was 90 minutes, and the final temperature after cooking was 49° C.

After cooking the curd and whey were discharged into a vat, cooled to 30° C. with stirring, and the whey drained off. The curd was then pressed, brine salted, dried, rubbed with oil and matured as in conventional Parmesan manufacture.

The yield of cheese was 2.1% greater than that obtained from the conventional process starting with the same quantity of milk from the same batch, on a milk solids recovery basis. After 8 weeks of maturation both the UF-based and conventional products were typical of young Parmesan cheese, and subsequent maturation proceeded normally.

TABLE 6

| Conventional Process | UF Based Process |
|---|---|
| Standardized Milk 331 Kg | Standardized Milk 331 Kg |
| 2.74% casein, 2.25% fat<br>↓ | 2.74% casein, 2.25% fat<br>↓<br>Retentate 66.0 Kg<br>↓ |
| Parmesan Cheese 26.94 Kg<br>32.67% moisture, 37.9% FDM,<br>pH 5.42, 3.84% salt<br>all at 8 weeks | Parmesan Cheese 27.34 Kg<br>32.65% moisture,<br>36.4% FDM, pH 5.25,<br>3.44% salt all at<br>8 weeks<br>Yield increase 2.1% |

EXAMPLE 7

Cheddar cheese from Milk Concentrate (illustrating use of evaporation in combination with ultrafiltration)

257 Kg of whole milk was standarized to a casein/fat ratio of 0.70, and then pasteurized and concentrated with CF=4.6 by ultrafiltration essentially as in Example 1, except that the total diafiltration water flow rate was 6% of milk intake rate.

A portion (4.7 kg - see Table 7) of this retentate was cooled, inoculated with 70 g of the frozen starter concentrate used in Example 1, and fermented at 30° C. for 2 hr when the retentate pH had fallen to 5.55. The remaining retentate was evaporated in a continuous swept-surface vacuum evaporator (Luwa Ltd., Zurich, Switzerland). The final concentrate had a fat concentration 5.85 times that of the original milk (Table 7). The effective Concentration Factor achieved by the combination of UF and evaporation was therefore 5.85:1. However, to achieve the same solids content (47.7%) in retentate by UF alone would require UF equipment capable of achieving a CF of about 6.5 with whole milk. This is possible with specialised UF equipment.

The evaporated UF retentate was cooled to 35° C. and mixed with the fermented retentate. Diluted calf rennet (225 g of a 1:5 dilution of normal strength rennet as in Example 1) was mixed over 1.5 min with the ripened retentate. Coagulation was carried out at 35° C. and then cutting, in both cases following the methods of Example 1. Agitation and cooking also followed the general methods of Example 1, but the cooking period extended over only 45 minutes and the final temperature was 39° C.

After cooking, the curd pH was 6.2. The whey was drained off, and subsequent cheesemaking operations proceeded essentially as in Example 1. The resulting cheese had the composition and characteristics of Cheddar cheese. It was obtained in a yield equivalent to 10.4% higher recovery of milk solids than for the equivalent conventionally-made control cheese.

TABLE 7

| Conventional Process | UF Based Process |
|---|---|
| Standardized Milk 257 Kg | Standardized Milk 257 Kg |
| 2.54% casein, 3.65% fat | 2.54% casein, 3.65% fat 12.42% total solids UF (CF = 4.6) |
| | ↓ |
| | Retentate 55.9 Kg |
| | 37.7% total solids Fermentation |
| | Evaporation ↓ Fermented Retentate 4.7 Kg pH 5.55 |
| | Evaporated Retentate 40.2 Kg |
| | ↓ |
| | Ripened retentate 44.9 Kg |
| ↓ | ↓ |
| Cheddar Cheese 25.52 Kg 35.1% moisture, 50.1% FDM, pH 5.25, 1.49% salt | Cheddar Cheese 29.50 Kg 37.9% moisture, 49.9% FDM, pH 5.41 ex-press, 1.57% salt Yield increase 10.4% |

We claim:

1. A process for the manufacture of cheese curd for conversion into a hard cheese, comprising the sequential steps of:
   (i) concentrating a milk or a product produced from milk by untrafiltration to produce a retentate having a Concentration Factor in the range of 2-8 and reducing the lactose in the retentate to a level of 1.0-6.2% w/w by diafiltration to produce an ultrafiltered and diafiltered retentate;
   (ii) separating the ultrafiltered and diafiltered retentate into a minor portion and a major portion, and fermenting the minor portion of retentate with at least one cheese starter culture to allow a pH drop due to fermentation of 0.2-2.0 pH units in the minor portion of the retentate; mixing the fermented minor portion with the major portion of retentate to give a ripened retentate the pH of which is 0.05-1.0 units lower than that of the original retentate;
   (iii) continuously coagulating the ripened retentate with a milk coagulating agent to produce a coagulum;
   (iv) cutting the coagulum at a time between 5 and 30 minutes after the addition of the coagulating agent, said cutting being performed in such a manner so that no adverse disruption of the internal structure of the coagulum occurs;
   (v) cooking the coagulum by heating to a temperature in the range of 30°-50° C., holding the cooked coagulum at a final cooking temperature until a curd having a composition suitable for conversion into a hard cheese is produced, said cooking operation being performed substantially immediately after cutting and while agitating the coagulum under conditions that do not cause adverse physical damage to the coagulum but are sufficient to prevent fusion and promote syneresis, the total duration of said combined cooking and agitation operations being in the range of 20-120 minutes; and
   (vi) separating the curd from whey expelled during syneresis in stage (v) to provide said cheese curd.

2. A process as claimed in claim 1, wherein the minor portion is 1-20% and step (ii) further comprises destroying bacteria by heating the minor portion at a temperature and for a period of time which provides bacterial destruction corresponding to heating at a temperature up to 90° C. for a period of time up to about 40 minutes, inoculating the minor portion at 20°-45° C. with one or more cultures of lactic acid bacteria to produce a fermented minor portion, and mixing the fermented minor portion with the major portion.

3. A process as claimed in claim 1, wherein during continuous coagulate the ripened retentate is agitated thoroughly following addition of the coagulating agent and is then permitted to undergo quiescent coagulation.

4. A process as claimed in claim 2, wherein during continuous coagulate the ripened retentate is agitated thoroughly following addition of the coagulating agent and is then permitted to undergo quiescent coagulation.

5. A process as claimed in claim 1, wherein reduced fat milk, skim milk, or reconstituted or recombined milk, is the milk product which is ultrafiltered and butterfat is added to the retentate after ultrafiltration.

6. A process as claimed in claim 4, wherein reduced fat milk, skim milk, or reconstituted or recombined milk, is the milk product which is ultrafiltered and butterfat is added to the retentate after ultrafiltration.

7. A process as claimed in claim 1, wherein solids content of the ultrafiltered and diafiltered retentate is increased by up to 4 times by evaporation.

8. A process as claimed in claim 4, wherein solids content of the ultrafiltration and diafiltered retentate is increased by up to 4 times by evaporation.

9. A process as claimed in claim 1, wherein bacteria are destroyed in all or part of the ultrafiltered and diafiltered retentate by heating at a temperature of up to 90° C. for a period of up to about 40 minutes or equivalent in terms of bacterial destruction.

10. A process as claimed in claim 1, wherein bacteria are destroyed in all or part of the ultrafiltered and diafiltered retentate by heating at a temperature of up to 90° C. for a period of up to about 40 minutes or equivalent in terms of bacterial destruction.

11. A process as claimed in claim 1, wherein bacteria are destroyed in the fermented minor portion of the retentate by heating at a temperature and for a period of time which provides bacterial destruction corresponding to heating at a temperature up to 90° C. for a period of time up to about 40 minutes.

12. A process as claimed in claim 1, wherein one or more additives comprising calcium chloride, phosphoric acid, lipases, esterases, proteases, peptidases or food colorants, are added to the retentate at any stage prior to coagulation.

13. A process as claimed in claim 4, wherein one or more additives comprising calcium chloride, phosphoric acid, lipases, esterases, proteases, peptidases or food colorants, are added to the retentate at any stage prior to coagulation.

14. The process of claim 1, wherein the reduction of the lactose in the retentate takes place simultaneously or subsequent to the concentration of the milk in step (i).

15. The process of claim 1, wherein the milk coagulating agent is rennet.

16. The process of claim 14, wherein the milk coagulating agent is rennet.

17. The process of claim 1, wherein the Concentration Factor is in the range of from about 4 to about 6.

18. A process for the manufacture of cheese curd for conversion into a hard cheese, comprising the sequential steps of:
  (i) concentrating a standardized milk by ultrafiltration at 50°–55° C. to produce a retentate having a Concentration Factor 4.5–5.5, with simultaneous diafiltration to reduce the lactose content of the retentate to 2.8–3.7% w/w;
  (ii) separating the retentate into a minor portion and a major portion, respectively containing 5–10% and 90–95% of the retentate, and fermenting the minor portion of retentate with at least one culture of lactic acid bacteria at 25°–31° C. until a pH of 5.2–5.6 is reached; followed by mixing of the fermented portion with the major portion of retentate to give a ripened retentate of pH 6.3–6.5;
  (iii) continuously coagulating the ripened retentate at 30°–35° C. with 0.5% of a 1:5 dilution of a milk coagulating agent in water to produce a coagulum;
  (iv) cutting the coagulum after 14–18 minutes from the addition of the milk coagulating agent, into particles approximating to 10 mm cubes in such a manner that no adverse disruption of the internal structure of the coagulum occurs;
  (v) agitating the coagulum substantially immediately after cutting in a vaned drum preheated to 30°–35° C. and rotated at 2–4 rpm under conditions such that there is no adverse physical damage to the coagulum but such as to prevent fusion and to promote syneresis;
  (vi) cooking the curd particles by heating to a temperature of 37° C.–40° C. over the 45–75 minutes while continuing agitation; and
  (vii) separating the curd particles from expelled whey to produce said cheese curd.

19. The process of claim 18, wherein the milk coagulating agent is rennet.

20. A process as claimed in claim 18, wherein said hard cheese is cheddar cheese.

* * * * *